May 21, 1940. J. E. HOGANDER 2,201,665

CONVEYER BELT

Filed Sept. 6, 1938

INVENTOR
JOHN E. HOGANDER
BY Paul, Paul, Moore & Giere
ATTORNEYS

Patented May 21, 1940

2,201,665

UNITED STATES PATENT OFFICE 2,201,665

CONVEYER BELT

John E. Hogander, Minneapolis, Minn.

Application September 6, 1938, Serial No. 228,583

2 Claims. (Cl. 198—189)

This invention relates to new and useful improvements in conveyer belts, and more particularly to such a device which is substantially non-stretchable.

Conveyer chains or belts such as are now commonly used in industrial plants for conveying cartons, bottle crates, and various other commodities, are usually constructed of a plurality of links having their ends pivotally connected together either by pivot pins, or by interlocking the ends of adjacent links to provide universal joints. These conveyer chains provide the propelling means for the cartons and commodities to be conveyed, and the runs thereof between pulleys or sprockets are usually supported upon suitable guides. Because of the nature of the commodities transported on these conveyer chains, it is not always desirable to lubricate the pivotal connections between links and, as a result these pivotal connections rapidly become worn. Such wear in the pivotal connections between the links is objectionable, in that it causes the chain to elongate, often to the extent that the spacing between the links is increased to such a degree that the chain does not properly fit the teeth of the sprocket wheel providing the drive therefor. When the chain becomes worn to such an extent, it is usually replaced by a new one, which may result in costly delays, and obviously is expensive.

It is therefore desirable that a conveyer chain be provided which will not elongate from long periods of use and heavy loads, and whereby the operation of the conveying apparatus may continue for long periods without interruption, with a resultant decrease in the cost of maintenance.

The novel conveyer chain featured in the present application has been designed to eliminate all of the objectionable features hereinbefore mentioned, and to provide a chain of this general character which does not require lubrication, and which may be operated for long periods without noticeably elongating, and whereby the life of the chain is prolonged, and its maintenance cost greatly reduced.

An object of the present invention therefore is to provide a conveyer chain having means for retaining the links thereof in substantially accurately spaced relation, lengthwise of the chains, without metal-to-metal wearing surfaces, such as found in conventional pivots, and whereby the chain is sufficiently flexible to permit it to pass around comparatively small sprockets or curves, without imparting undue strains to the links thereof.

A further object is to provide a conveyer chain comprising an endless flexible cable having a plurality of link elements secured thereto in fixed relation, lengthwise of the cable, and said elements having means thereon adapted to be engaged by the teeth of a sprocket for driving the chain.

A further object is to provide means for controlling the flexing of the cable between links, whereby the cable is guided to assume a more uniform curve rather than a series of tangents from one link to the next.

Other objects of the invention reside in the novel construction of the chain, whereby a flexible cable is utilized to retain the links thereof in spaced relation; in the novel manner of securing the links to the cable, whereby they are not likely to relatively shift thereon; in the novel means provided for securing together the ends of the cable to make it endless, and whereby the terminals of the cable are not likely to become separated; in the unique arrangement of the lugs on the cable, whereby they are interlocked with one another and whereby the upper and lower sides of the chain provide continuous and unbroken surfaces, whereby cartons and other commodities may readily be conveyed thereon.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

The novel device herein disclosed is shown comprising a flexible steel cable 2, to which is secured, in longitudinally spaced relation, a plurality of link elements, generally indicated by the numeral 3.

Figure 3:
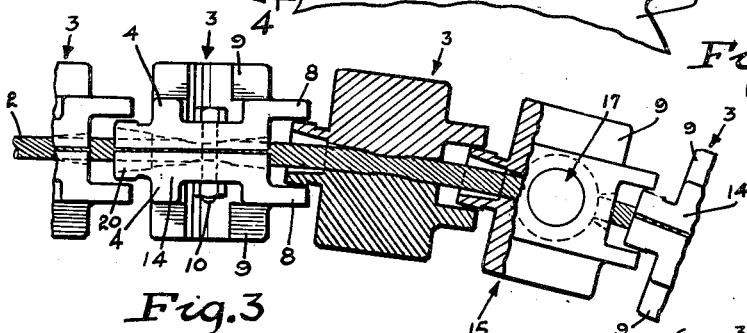
Figure 3 is a plan view of a portion of the cable showing the means for securing together the ends of the cable.
Figure 2:
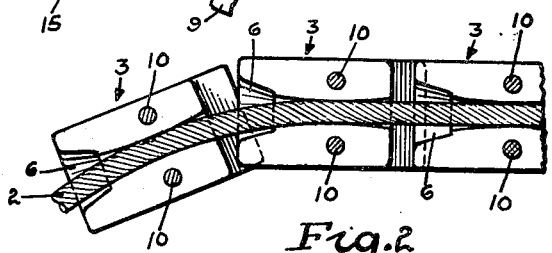
Figure 2 is a detail sectional view on the line 2—2 of Figure 4, showing the construction of the link elements and the manner of securing them to the flexible cable.
Figure 4:
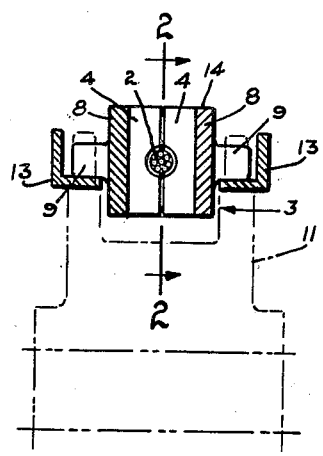
Figure 4 is a transverse sectional view on the line 4—4 of Figure 1, showing a guide for supporting the weight of the chain between sprockets or pulleys.
Figure 6:
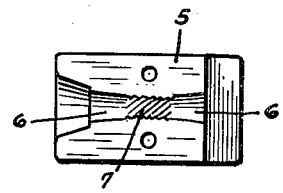
Figure 6 is a detail view showing the means provided on the inner sides of the links for receiving the cable.
Figure 5:
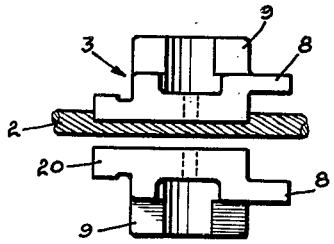
Figure 5 is a detail view showing the manner of mounting the link elements on the cable.

Each link is shown composed of two parts, indicated by the numeral 4, and each part is provided on its inner surface 5 with a groove having tapered end portions 6 and preferably having its central portion 7 corrugated or spirally grooved to substantially fit the periphery of the flexible cable 2. The two halves or parts of each link 3 are fitted onto the cable 2, as shown in Figure 5, and secured thereto by suitable clamping bolts 10, received in apertures provided in the two parts of the link. When the parts 3 of the links are secured together as shown in Figure 3, the tapered end portions 6 of the grooves thereof cooperate to provide a filled shaped opening at each end of each link, the walls of which cooperate to guide or control the flexing or bending of the cable between links, whereby the cable will assume a more uniform curve, as clearly illustrated in Figure 2. By thus controlling the flexing of the cable between links, it cannot kink or bend sharply, whereby its life is materially prolonged.

Each link is preferably formed at one end with an extension 20, and at its opposite end with spaced flanges 8. These extensions and flanges are adapted to interlock with one another along the length of the chain, as best illustrated in Figure 3, and serve to retain the links in proper alinement, rotatively, on the cable. The clearance between the interlocking extensions and flanges 20 and 8, respectively, is sufficient to permit free movement of the links with respect to one another, to permit the chain to freely pass around a pulley or sprocket, and also whereby it may be curved laterally, as when passing around a curve in a horizontal plane.

Figure 1:
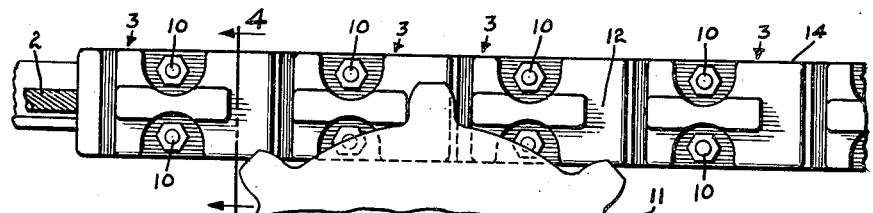
Figure 1 is a side elevation of the novel chain herein disclosed.

Each link 3 is further provided with oppositely projecting lugs 9, and these lugs along the length of the chain, cooperate to provide a driving connection between the chain and a suitable sprocket wheel 11, as shown in Figure 1. In other words, the spacing between the lugs 9 lengthwise of the chain, is such as to provide gaps 12 between said lugs adapted to receive the teeth of the sprocket 11. The lugs 9 may also engage suitable guides 13 provided at each side of the chain, which guides serve to carry the weight of the chain between sprockets or sheaves. The guides 13 also support the chain in such a manner that the upper surfaces 14 of the links will be horizontally alined so as to provide an unbroken surface adapted to engage the cartons or other commodities to be conveyed by the chain.

Figure 7:
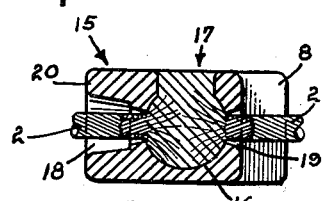
Figure 7 is a detail sectional view through the link in which the ends of the cable are secured together.

Another feature of the invention resides in the novel means provided for securing together the ends of the flexible cable 2, whereby they cannot become separated from one another, and whereby the cable is made endless. As best shown in Figures 3 and 7, one of the links in the chain, generally indicated by the numeral 15, is made in one piece, or, in other words, is not split, as are the links 3. The link 15 has a cavity 16, which preferably is open at the top of the link, as shown at 17 in Figure 7. Tapered apertures 18 and 19 are provided in opposite walls of the cavity 16 for receiving the ends of the cable and whereby the terminals thereof may be received in the cavity 16. When the ends of the cable are received in the cavity 16, the wire strands thereof are separated or frayed, and the cavity is then filled with a suitable bonding material, such as lead, which, when in its molten state, freely flows between the strands of the cable and thereby unites the two ends of the cable in such a manner that these ends cannot possibly become separated from one another or from the link 15.

The novel chain device herein disclosed, has been found very practical in actual use. By using flexible steel cables for retaining the links 3 in spaced relation, lengthwise of the chain, the use of pivots or other rapidly wearing connections between links is eliminated. The size of the flexible cable is such as to adequately carry the maximum load imposed on the chain, without stretching, whereby the chain may be used over long periods without danger of the chain becoming elongated to the extent that it is rendered useless, as frequently occurs when using conventional chains, utilizing pivots for coupling them together. While I have herein referred to the flexible elements 2 as steel cables, it is to be understood that these elements may be made of any suitable material applicable for the purpose. The links are secured to the cables independently of one another, so that if for any reason it becomes desirable or necessary to remove a link, it may readily be done without removing the chain from its supporting means.

Also, because of the novel manner in which the links are coupled together, the chain is substantially noiseless in operation, which is a very desirable feature, particularly in industrial plants where many chain conveyers are sometimes employed.

In the accompanying drawing, I have shown the invention embodied in the construction of a conveyer chain or belt, but it is to be understood that it may be used for various other purposes, where applicable, without departing from the scope of the invention. The number of cables used, and also the specific design of the link elements may also be varied, depending upon the nature or character of the apparatus with which the invention is to be used.

I claim as my invention:

1. In a conveyer chain, an endless flexible steel cable, a plurality of split elements fixedly clamped thereto lengthwise of the cable and serving as links, said links having oppositely disposed lugs adapted to engage suitable tracks to carry the weight of the chain, said lugs being spaced apart lengthwise of the chain to provide gaps therebetween adapted to receive the teeth of a driving member, and means in the ends of said links for permitting free flexing of the cable without damage thereto.

2. In a conveyer chain comprising a flexible steel cable, a plurality of split link elements secured thereto in equi-spaced relation lengthwise of the cable, each of said link elements comprising two similar parts each having a longitudinal groove therein provided with a relatively short cable-engaging portion intermediate its ends, said grooves flaring outwardly from said cable-engaging portions to permit free and unrestricted flexing of the cable between said links, apertures in said link parts at opposite sides of the cable-engaging portions thereof for receiving bolts thereby to securely clamp the link elements to the cable, each part of each link element having a flange extending outwardly therefrom in parallel relation to the cable, and the flanges of the parts of each link element cooperating to provide a vertically disposed recess in one end of each element, and a projection on the opposite end of each part of each link element, said projections cooperating to provide a lug at the opposite end of each link element, said lugs being adapted to be received in the recesses of adjacent link elements, and the contacting surfaces of said flanges and lugs being substantially equal to the vertical dimension of the link elements, whereby said flanges and lugs will prevent the link elements from rotating on the cable relatively to one another.

JOHN E. HOGANDER.